US005330546A

United States Patent [19]

Ramesh et al.

[11] Patent Number: 5,330,546
[45] Date of Patent: Jul. 19, 1994

[54] HYDROPHOBIC POLYELECTROLYTE COAGULANTS FOR CONCENTRATING COAL TAILINGS

[75] Inventors: Manian Ramesh, Naperville; Ram A. Venkatadri, South Chicago; Lawerence J. Connelly, Oak Lawn; Jeffrey R. Cramm, Winfield, all of Ill.

[73] Assignee: Nalco Chemical Company, Naperville, Ill.

[21] Appl. No.: 931,828

[22] Filed: Aug. 18, 1992

[51] Int. Cl.⁵ ............................ C10L 9/10; C02F 1/56
[52] U.S. Cl. ........................................ 44/620; 44/626; 210/734
[58] Field of Search ................... 44/620, 626; 210/734

[56] References Cited

U.S. PATENT DOCUMENTS

| | | | |
|---|---|---|---|
| 3,461,163 | 8/1969 | Boothe | 210/734 |
| 4,151,202 | 4/1979 | Hunter et al. | 524/351 |
| 4,555,329 | 11/1985 | Sykes | 209/5 |
| 4,619,669 | 10/1986 | Jones et al. | 44/621 |
| 4,673,511 | 6/1987 | Richardson et al. | 210/734 |
| 4,715,962 | 12/1987 | Bhattocharyya et al. | 210/734 |
| 4,720,346 | 1/1988 | Flesher et al. | 210/738 |
| 4,835,206 | 5/1989 | Farrar et al. | 210/736 |
| 4,869,829 | 9/1989 | Casey | 210/735 |
| 4,906,386 | 3/1990 | Vasconcellos et al. | 210/735 |

Primary Examiner—Margaret Medley
Attorney, Agent, or Firm—Robert A. Miller; Joseph B. Barrett; Paul D. Greeley

[57] ABSTRACT

A method for concentrating coal tailings which comprises steps of: feeding the coal tailings to a thickener; treating the coal tailings with a hydrophobic polyelectrolyte copolymer coagulant which comprises diallyldimethylammonium chloride and a more hydrophobic monomer, the coagulant is added to the coal tailings in an amount between about 0.05 to about 0.25 lb/ton; treating the coal tailings with a flocculant in an amount between about 0.05 to about 0.25 lb/ton; discharging substantially concentrated tailing; and withdrawing substantially clarified liquid from the thickener.

7 Claims, 1 Drawing Sheet

HYDROPHOBIC POLYELECTROLYTE COAGULANTS FOR CONCENTRATING COAL TAILINGS

The present invention relates generally to the use of novel hydrophobic polyelectrolyte compositions as coagulants for coal tailings thickening or concentrating. These polyelectrolyte compositions are preferably hydrophobically associating copolymers of diallyldimethylammonium chloride (DADMAC) and either dimethylaminoethylacrylate (DMAEA) or dimethylaminoethylmethacrylate (DMAEM).

BACKGROUND OF THE INVENTION

Coal is the most abundant natural energy source in the world. A significant portion of the U.S. domestic energy requirements are met by burning coal as a fossil fuel. There are various types of coal found within the U.S., i.e., anthracite, semi-anthracite, low-volatile bituminous coal, medium and high volatile bituminous coal, sub-bituminous coal, and lignite. Coals such as anthracite and semi-anthracite typically have high ash and sulfur contents and therefore require beneficiation prior to use.

The primary purpose of coal beneficiation is to reduce the incombustible ash content thus enhancing the heat content. Reduction in the ash content results in savings in transportation and ash disposal costs. Sulfur, mainly in the form of purite, is also reduced.

Another important economic factor to be considered in coal processing is the recovery and reuse of process water. Water is typically very expensive and there are often limits on total usage. Also, strict environmental controls prohibit or severely limit discharge of process water. Thus, it is imperative that solids be efficiently removed from the process water and water recycled to the process stream.

Beneficiation of coal is effected using two primary properties of coal, i.e., (1) differences in specific gravity between coal and its impurities, and (2) differences in surface characteristics between coal and its impurities. Since the higher ash content fractions are usually found in the finer coal sizes, some plants only screen out these sizes to beneficiate the coal. However, since the quantity of such fine coal is on the rise, even this is treated.

A coal beneficiation plant may be broadly categorized into specific gravity separation and fine coal treatment. In gravity separation, cleaning units make use of the differences in specific gravity between coal and its impurities to effect separation. Normally, the specific gravity of the clean coal is less than its impurities. Some commonly used equipment for gravity separation are: jigs, heavy medium baths and cyclones, washing tables, water only cyclones and spirals.

Fine coal treatment incorporates a flotation cell(s), clean coal filter and thickener. In the flotation cell, a collector and frother are added to the flotation feed. The collector (e.g., diesel oil #2) selectively imparts hydrophobicity to the coal particles. This increased hydrophobicity makes the air bubbles more likely to attach to the coal particles. The frother (e.g., an alcohol based product) reduces the surface tension of the air/water interface, thus making a stable froth.

The concentrate (i.e., clean coal) from the flotation cells goes to the clean coal filter and is dewatered. The tailings from the flotation cell go to the thickener where they are thickened and discharged.

The thickener is treated with coagulants and flocculants to enhance settling. Typically, the coagulants and flocculants are added at several points along the feed line to the thickener and in different sequences. Coagulation is the destabilization by surface charge neutralization of stable negatively charged particles that are in suspension (i.e., settleable or dispersed) through the utilization of inorganic salts or cationic polyelectrolytes. Flocculation is the aggregation of finely divided particles which are suspended in a liquid through the utilization of an entrapping agent (i.e., an inorganic flocculant) or a bonding agent (i.e., an organic flocculant) that brings the particles together.

Although some inorganics, principally alum and iron salts, are still used as coagulants, water soluble organic polymers are more commonly used as coagulants. Both naturally occurring and synthetic polyphers find use as coagulants and flocculants in the mining industry. The principal natural polymers used are starch and guar, both of which are high-molecular weight polymers of simple sugars (i.e., polysaccharides). Starch is a polymer of glucose consisting of a mixture of linear (amylose) and branched segments (amylopectin).

Synthetic polymers have the advantage that they can be tailored to a specific application. This has resulted in a wide range of commercially available coagulants and flocculants of varying charge, composition, and molecular weight. The most widely used synthetic coagulants are polydiallyldimethylammonium chloride (poly-DADMAC or DADMAC) and condensation polymers of dimethylamine and epichlorohydrin (Epi/DMA). These structures vary greatly in molecular weight and are in the range of 20,000 to 100,000.

The present inventors have developed various novel hydrophobic polyelectrolyte copolymers which may be used as coagulants in the thickening process during coal beneficiation. These hydrophobic monomers exhibit improved performance or activity in coal tailings thickening than do conventional inorganic and organic coagulants. In addition to the hydrophobicity, the hydrophobic monomer used to synthesize the polyelectrolyte copolymers according to the present invention produce copolymers with substantially higher molecular weights than conventional synthetic DADMAC homopolymers prepared under the same conditions. Furthermore, the incorporation of a quaternary group, such as benzyl, into the copolymer of the present invention reduces the bulk viscosity of the resultant copolymer relative homopolymers of DADMAC with comparable molecular weights. As such, the hydrophobic polyelectrolyte copolymers of the present invention exhibit higher polymer concentrations than conventional organic coagulants. These hydrophobically associating copolymers also demonstrate enhanced performance with replacement ratios on the order of 0.45–0.50.

The present invention also provides many additional advantages which shall become apparent as described below.

SUMMARY OF THE INVENTION

A method for concentrating coal tailings which include liquid and colloidal particles. This method comprises the steps of: feeding the coal tailings to a thickener; treating the coal tailings with a hydrophobic polyelectrolyte copolymer coagulant which comprises diallyldimethylammonium chloride (DADMAC) and a more hydrophobic monomer selected from the group consisting of: quaternized dimethylaminoethylacrylates (DMAEA) and quaternized dimethylaminoethylmethacrylates (DMAEM), the coagulant is added to the coal tailings in an amount between about 0.05 to about 0.25 lb/ton, whereby the charges on the surfaces of the colloidal particles are reduced or neutralized; treating the coal tailings with a flocculant in an amount between about 0.05 to about 0.25 lb/ton, whereby the colloidal particles agglomerate and settle out as concentrated tailings; discharging substantially concentrated tailing; and withdrawing substantially clarified liquid from the thickener.

The quaternized DMAEA and DMAEM monomers may include methyl chloride quaternary (MCQ) or $C_4$ to $C_{20}$ aliphatic and aromatic chloride quaternaries such as benzyl chloride quaternary (BCQ) or cetyl chloride quaternary (CCQ).

These hydrophobic polyelectrolyte copolymers are preferably made via a semi-batch process. The semi-batch process typically comprises the steps of: adding diallyldimethylammonium chloride to a polymerization reactor vessel in an amount between about 1 to about 19 weight percent; heating the diallyldimethylammonium chloride to a temperature in the range between about 47° C. to about 57° C., depending upon the initiator; adding a polymer initiator dropwise to the diallyldimethylammonium chloride in an amount between about 0.05 to about 0.4 weight percent; adding a hydrophobic monomer dropwise to the diallyldimethylammonium chloride in an amount between about 3 to about 19 weight percent; and heating the mixture of diallyldimethylammonium chloride, polymer initiator and more hydrophobic monomer to a temperature in the range between about 47° C. to about 82° C.

Other and further objects, advantages and features of the present invention will be understood by reference to the following specification.

DESCRIPTION OF THE PREFERRED EMBODIMENTS

Figure 1:
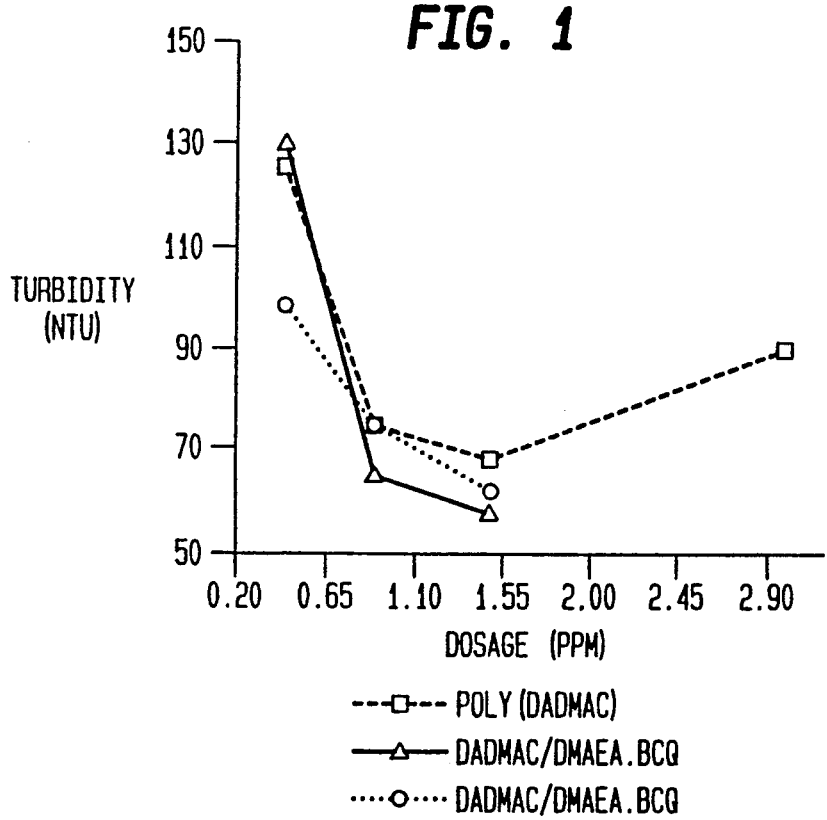
FIG. 1 is a graph plotting turbidity verses dosage for various polyelectrolyte coagulants.

The present inventors have developed a new class of polyelectrolyte copolymer coagulants which exhibit enhanced performance in coal refuse or tailings thickening. These coagulants are copolymers of DADMAC and a more hydrophobic monomer such as dimethylaminoethylacrylate benzyl chloride quaternary (DMAEA.BCQ). Such hydrophobically associating copolymers have an enhanced performance with replacement ratios on the order of about 0.45 to about 0.50.

In the beneficiation of fine coal, a collector and a frother are added to a flotation feed. The concentrate, i.e., clean coal, from the flotation cells goes to the clean coal filter and is dewatered. The tailings or refuse from the flotation cells go to the thickener where they are thickened and discharged.

The tailings or refuse are preferably treated with coagulants and flocculants. It has been discovered that surface charge neutralization of colloidal particles in the tailings suspension can be enhanced by the use of a coagulant of poly(DADMAC) or DADMAC which has been modified to incorporate a certain degree of hydrophobic nature. Such a modification can be accomplished by copolymerizing DADMAC with hydrophobic monomers, such as, DMAEA.BCQ, DMAEM.BCQ, DMAEA.CCQ, DMAEM.CCQ, DMAEA.MCQ and DMAEM.MCQ. Moreover, these copolymers are particularly effective in thickening coal tailings or refuse when they are prepared via a semi-batch technique instead of a batch mode.

This hydrophobic polyelectrolyte copolymer coagulant preferably comprises a diallyldimethylammonium chloride and a hydrophobic monomer. The hydrophobic monomer is at least one monomer selected from the group consisting of: quaternized dimethylaminoethylacrylates and quaternized dimethylaminoethylmethacrylates. DMAEA and DMAEM are preferably quaternized using $C_4$ to $C_{20}$ chloride quaternaries or methyl chloride quaternaries. The preferred $C_4$ to $C_{20}$ chloride quaternaries are benzyl chloride quaternary and cetyl chloride quaternary.

The DADMAC can be prepared in accordance with any conventional manner such as the technique described in U.S. Pat. No. 4,151,202 (Hunter et al.), which issued on Apr. 24, 1979, and which is incorporated herein by reference.

The quaternized dimethylaminoethylacrylate is selected from the group consisting of: dimethylaminoethylacrylate methyl chloride quaternary and dimethylaminoethylacrylates having $C_4$ to $C_{20}$ chloride quaternary. The dimethylaminoethylacrylates having $C_4$ to $C_{20}$ chloride quaternary are preferably either dimethylaminoethylacrylate benzyl chloride quaternary or dimethylaminoethylacrylate cetyl chloride quaternary.

The quaternized dimethylaminoethylmethacrylate is selected from the group consisting of: dimethylaminoethylmethacrylate methyl chloride quaternary and dimethylaminoethylmethacrylates having $C_4$ to $C_{20}$ chloride quaternary. The dimethylaminoethylmethacrylates having $C_4$ to $C_{20}$ chloride quaternary are preferably either dimethylaminoethylmethacrylate benzyl chloride quaternary or dimethylaminoethylmethacrylate cetyl chloride quaternary.

The diallyldimethylammonium chloride and hydrophobic monomer are preferably present in a molar ratio in the range from 20:80 to 99:1.

The unique semi-batch process for making the hydrophobic polyelectrolyte copolymers according to the present invention comprise the following steps:

a. adding diallyldimethylammonium chloride to a polymerization reactor vessel in an amount between about 1 to about 19 weight percent;

b. heating the diallyldimethylammonium chloride to a temperature in the range between about 47° C. to about 57° C.;

c. adding a polymer initiator dropwise to the diallyldimethylammonium chloride in an amount between about 0.05 to about 0.4 weight percent;

d. adding a hydrophobic monomer dropwise to the diallyldimethylammonium chloride in an amount between about 3 to about 19 weight percent; and e. heating the mixture of diallyldimethylammonium chloride, polymer initiator and hydrophobic monomer to a temperature in the range between about 47° C. to about 57° C.

Typically, deionized water is added periodically as needed during the polymerization process in a total amount between about 63 to about 80 weight percent. In some instances it is preferable to mix diallyldimethylammnonium chloride with NaCl and deionized water to form a diallyldimethylammonium chloride solution prior to charging it into the reactor vessel. The NaCl is added in an amount between about 2.0 to about 3.5 weight percent and the deionized water is added in an amount between about 1.0 to about 2.5 weight percent. This diallyldimethylammonium chloride solution has a concentration of diallyldimethylammonium chloride in the range between about 54 to about 59%.

The diallyldimethylammonium chloride, polymer initiator and hydrophobic monomer are heated at a temperature in the range between about 47° C. to about 57° C. for a period of between about 4 to 5 hours. Thereafter, the temperature of the reactor vessel is increased to about 72° C. to about 82° C. for a period of between about 1 to 4 hours. After polymerization has been completed the copolymer product is typically diluted with deionized water, cooled and stored.

The polymer initiator is selected from the group consisting of V-50 (2,2'-azobis(2-amidinopropane) hydrochloride), VA-44 (2,2'-azobis(N,N'-dimethyleneisobutyramidine) dihydrochloride), ammonium persulfate, and ammonium persulfate/sodium meta bisulfite.

The flocculant causes the aggregation of the neutralized colloidal particles which are suspended in the tailings suspension. Aggregation is the result of either entrapping agents (i.e., inorganic flocculants) or bonding agents (i.e., organic flocculants) bringing the neutralized particles together. One preferred flocculant is a copolymer of 78% acrylamide and 22% acrylic acid.

The coagulants and flocculants can be added at several points along the feed line to the thickener and in different sequences. A typical thickener is a gravity sedimentation unit which is a cylindrical continuous thickener with mechanical sludge raking arms. The tailings (i.e., a solids/liquid dispersion) enters the thickener at the centerwell. The coagulants and/or flocculants are added at points in the feed line and/or centerwell. The number of addition points, sequence, flocculant, coagulant, etc. are determined by laboratory cylinder tests for each particular application. The flocculated solids settle to the bottom of the thickener. The mechanical arms rake the sludge and it is discharged. The clarified water overflows into a launder surrounding the upper part of the thickener.

The typical coagulant dosage added to the thickener is about 0.05 to about 0.25 lb/ton of flotation tailings. Flocculant is also added to the thickener in an amount between about 0.05 to about 0.25 lb/ton of flotation tailings.

After treatment of the flotation tailings with sufficient coagulants and flocculants, the thickener underflow or refuse (i.e., concentrated tailings) are removed from the bottom of the thickener, while water and/or other liquids are taken out overhead. The water can thereafter be recycled as process water for use in the beneficiation process or disposed of in pubic waterways. The concentrated tailings or refuse from the thickener can be thereafter used primarily as landfill.

In most instances, adding a given amount of flocculant in two or more increments results in better performance than adding the same amount of flocculant in one increment. It is not unusual to be able to reduce the amount of flocculant required by as much as 30–40% by multi-point addition and still achieve the required settling rate. Multi-point addition will also provide improved clarity (i.e., lower suspended solids) at a given settling rate.

This practice is implemented in a beneficiation plant process by adding the flocculant at different points in the feed line to the thickener. The improvement results from reducing the amount of surface area that the second or third portion of flocculant actually contacts when added to the system.

In many applications, use of both coagulants and flocculants are often required. Classical theory suggests that addition of a coagulant should be made first to minimize the zeta potential on the particles and then the flocculant should be added to form a larger, faster settling floc. In relatively homogeneous solid/liquid dispersions this is often the best addition sequence.

However, many solid/liquid dispersions are heterogeneous. For example, a simple coal wash water that has to be cleaned up prior to re-use is generally a mixture of coal, clay, and water. In this system, the clay tends to have a cationic demand and coal has (for all practical purposes) no cationic demand. Coal will, however, adsorb the coagulant. The treatment sequence begins with the addition of a flocculant which visibly agglomerates the coal with little or no impact on the clay. Next, addition of a coagulant will coagulate the clay. Finally, more flocculant is added to "tie up" the flocs of coal and clay. By beginning the treatment sequence with flocculant, the coal is flocculated and its surface area is reduced. Less coagulant is required to satisfy the coagulant demand of the clay because less is diverted to the coal. Using this addition sequence can often reduce the coagulant requirements by 50% or more.

The present invention can best be understood by reference to the following working and comparative examples.

EXAMPLE 1

A hydrophobic polyelectrolyte copolymer was formed from 95% diallyldimethylammonium chloride (DADMAC) and 5% dimethylaminoethylmethacrylate cetyl chloride quaternary (DMAEM.CCQ) monomers. The following reagents were used:

| | |
|---|---|
| 250.62 grams | 62% Solution of DADMAC |
| 150.00 grams | 20% Solution of DMAEM.CCQ |
| 0.30 grams | Versene |
| 10.00 grams | Adipic Acid |
| 15.00 grams | 25% Solution of Ammonium Persulfate |
| 75.08 grams | Deionized Water |

DADMAC was added to a mixture of DMAEM.CCQ, adipic acid, versene, and deionized water. This reaction mixture was then heated to about 50° C. and thereafter the ammonium persulfate was added. The reactor vessel was purged with nitrogen and stirred at about 250 rpm. After 30 minutes a precipitate began to form so an additional 154.76 grams of a 62% solution of DADMAC, 10 grams of a 25% solution of ammonium persulfate and 0.10 grams of versene were added to the reactor vessel. Thereafter, the temperature of mixture was increased to 65° C. for 6 hours and then cooled to ambient temperature. The final molar ratio of DADMAC to DMAEM.CCQ was 96.68% to 3.32%.

EXAMPLE 2

A hydrophobic polyelectrolyte copolymer was formed from 70% DADMAC and 30% dimethylaminoethylacrylate benzyl chloride quaternary (DMAEA.BCQ) monomers. The following reagents were used:

| | |
|---|---|
| 188.03 grams | 62% Solution of DADMAC |
| 104.28 grams | 80% Solution of DMAEA.BCQ |

| | |
|---|---|
| 0.20 grams | Versene |
| 15.00 grams | 25% Solution of Ammonium Persulfate |
| 692.49 grams | Deionized Water |

DADMAC and 100 grams of deionized water were placed within a polymerization reactor vessel which was purged with nitrogen. Thereafter, the ammonium persulfate was added dropwise to the reactor vessel via a syringe pump for 2 hours. Simultaneously, DMAEA.BCQ was added dropwise to the reactor vessel via a syringe pump for 2 hours. The DMAEA.BCQ was diluted with 100 grams of deionized water prior to being loaded into the syringe pump. Thereafter, the remaining deionized water and versene were added to the reactor vessel which was then heated at 65° C. for 6 hours.

EXAMPLE 3

A hydrophobic polyelectrolyte copolymer was formed from 70% DADMAC and 30% dimethylaminoethylacrylate benzyl chloride quaternary (DMAEA.BCQ) monomers. The following reagents were used:

| | |
|---|---|
| 188.03 grams | 62% Solution of DADMAC |
| 104.28 grams | 80% Solution of DMAEA.BCQ |
| 0.20 grams | Versene |
| 1.17 grams | V-50 |
| 706.00 grams | Deionized Water |
| 0.32 grams | $H_2SO_4$ |

DADMAC was placed within a polymerization reactor vessel which was purged with nitrogen and stirred at 300 rpm and a torque of 350 dynes-cm. The pH was adjusted by addition of $H_2SO_4$. After 40 minutes the torque gradually rose to 2240 dynes-cm. Thereafter, 100 grams of deionized water was added to the DADMAC which reduced the torque to 850 dynes-cm. This was followed by the dropwise addition of V-50 and DMAEA.BCQ via separate syringe pumps for 2 hours. The DMAEA.BCQ was diluted with 100 grams of deionized water. The reactor vessel was then heated at 65° C. for 5 hours. After 2 hours and 20 minutes the torque reached 2920 dynes-cm. 100 grams of deionized water was again added which reduced the torque to 1180. After 3 hours and 15 minutes another 100 grams of deionized water was added to the polymerizing product. After 5 hours another 100 grams of deionized water was added to the reactor vessel and the temperature was raised to 80° C. for 1 hour. Thereafter, the resulting polymer was diluted with the remaining deionized water, cooled and stored.

EXAMPLE 4

A hydrophobic polyelectrolyte copolymer was formed from 80% DADMAC and 20% dimethylaminoethylmethacrylate cetyl chloride quaternary (DMAEM.CCQ) monomers. The following reagents were used:

| | |
|---|---|
| 188.02 grams | 62% Solution of DADMAC |
| 83.43 grams | 100% Solution of DMAEM.CCQ |
| 0.20 grams | Versene |
| 1.17 grams | V-50 |
| 727.03 grams | Deionized Water |
| 0.15 grams | $H_2SO_4$ |

DADMAC was placed within a polymerization reactor vessel which was purged with nitrogen and stirred at 300 rpm. The pH was adjusted by addition of $H_2SO_4$. 150 ml of deionized water was added to the DADMAC. This was followed by the dropwise addition of V-50 and DMAEM.CCQ via separate syringe pumps for 2 hours. The DMAEM.CCQ was diluted with 100 grams of deionized water. The reactor vessel was then heated at 65° C. for 4.5 hours. Between 1.5 to 2 hours 180 ml of deionized water was again added. After 4.5 hours the temperature was raised to 70° C. for 0.5 hours. Thereafter, the resulting polymer was diluted with the remaining deionized water, cooled and stored.

EXAMPLE 5

A hydrophobic polyelectrolyte copolymer was formed using the same technique described in Example 4 above from 80% DADMAC and 20% dimethylaminoethylacrylate benzyl chloride quaternary (DMAEA.BCQ) monomers. The following reagents were used:

| | |
|---|---|
| 227.52 grams | 62% Solution of DADMAC |
| 73.68 grams | 80% Solution of DMAEA.BCQ |
| 0.40 grams | Versene |
| 1.42 grams | V-50 |
| 696.63 grams | Deionzed Water |
| 0.35 grams | $H_2SO_4$ |

However, the water was added as needed. Table 1 below sets forth the time of deionized water addition during the semi-batch polymerization process.

TABLE 1

| SPEED OF ROTATION | TORQUE (DYNES-CM) | TIME | H2O ADDITION |
|---|---|---|---|
| 200 | 400 | 0 | 0 |
| 200 | 850 | 30 min. | 0 |
| 200 | 1200 | 45 min. | 50 grams |
| 200 | 700 | 45.1 min. | — |
| 200 | 1600 | 1 hr. 10 min. | 50 grams |
| 200 | 1000 | 1 hr. 10.1 min. | — |
| 200 | 1510 | 1 hr. 35 min. | 50 grams |
| 200 | 1200 | 1 hr. 35.1 min. | 50 grams |
| 200 | 650 | 1 hr. 35.2 min. | — |
| 200 | 1500 | 1 hr. 55 min. | — |
| 200 | 1610 | 2 hr. 12 min. | 50 grams |
| 200 | 558 | 2 hr. 12.1 min. | — |

EXAMPLE 6

A hydrophobic polyelectrolyte copolymer was formed from DADMAC and 10% dimethylaminoethylacrylate benzyl chloride quaternary ( DMAEA. BCQ ) monomers. The following reagents were used:

| | |
|---|---|
| 251.79 grams | 67% Solution of DADMAC |
| 39.13 grams | 80% Solution of DMAEA.BCQ |
| 0.40 grams | Versene |
| 3.36 grams | V-50 |
| 678.00 grams | Deionized Water |
| 27.52 | NaCl |

The semi-batch procedure was as follows:
(1) A solution comprising 251.79 grams of a 67% solution of DADMAC, 27.52 grams of NaCl and 16.6 grams of deionized water was added to a polymerization reactor vessel.

(2) The polymerization reactor vessel was then purged with nitrogen, stirred at 200 rpm and heated to 57° C.

(3) Then 400 mg of versene were added to the reactor vessel.

(4) 39.13 grams of DMAEA.BCQ were diluted with 15.87 grams of deionized water, then 160 mg of versene were added, stirred and loaded into a syringe pump.

(5) 500 grams of water were disposed in an addition funnel attached to the reactor vessel and nitrogen sparged continuously.

(6) 1.68 grams of V-50 were dissolved in 45.16 grams of deionized water and loaded into another syringe pump.

(7) At 57° C., 11.7 grams of the V-50 solution were added to the reactor vessel, together with the dropwise addition of the DMAEA.BCQ.

(8) Additional deionized water was added from time to time as required.

(9) After 5 hours the temperature was raised to 82° C. for 1 hour.

(10) Thereafter, the resulting polymer was diluted with the remaining deionized water, cooled and stored.

EXAMPLE 7

A hydrophobic polyelectrolyte copolymer was formed from 90% DADMAC and 10% dimethylaminoethylacrylate benzyl chloride quaternary (DMAEA.BCQ) monomers. The following reagents were used in the semi-batch process:

| | |
|---|---|
| 185.10 grams | 67% Solution of DADMAC |
| 28.77 grams | 80% Solution of DMAEA.BCQ |
| 0.15 grams | Versene |
| 2.48 grams | V-50 |
| 498.42 grams | Deionized Water |
| 20.23 grams | NaCl |

DADMAC, NaCl, and 12.20 grams of deionized water were charged into a reaction vessel and heated to 57° C. in a nitrogen atmosphere. Thereafter, the DMAEA.BCQ and 1.24 grams of V-50 were added dropwise for 4 hours via separate syringe pumps to the mixture of DADMAC, NaCl and water. 500 ml of deionized water was taken in an addition funnel, purged with nitrogen and added from time to time as needed. Thereafter, the versene was added and the reaction vessel was heated at 57° C. for an additional 5 hours. 1.24 grams of V-50 was added and the reaction vessel was heated at 82° C. for 4.5 hours. The resultant polymer product was diluted with the remaining deionized water, cooled and stored.

EXAMPLE 8

A hydrophobic polyelectrolyte copolymer was formed from 90% DADMAC and 10% dimethylaminoethylacrylate benzyl chloride quaternary (DMAEA.BCQ) monomers. The following reagents were used:

| | |
|---|---|
| 251.79 grams | 67% Solution of DADMAC |
| 39.13 grams | 80% Solution of DMAEA.BCQ |
| 0.20 grams | Versene |
| 3.36 grams | V-50 |
| 705.52 grams | Deionized Water |

DADMAC and deionized water were charged into a reaction vessel and heated to 57° C. in a nitrogen atmosphere. Thereafter, the DMAEA.BCQ and 1.68 grams of V-50 were added dropwise for 4 hours via separate syringe pumps to the mixture of DADMAC, NaCl and water. 500 ml of deionized water was taken in an addition funnel, purged with nitrogen and added from time to time as needed. Thereafter, the versene was added and the reaction vessel was heated at 57° C. for an additional 5 hours. 1.68 grams of V-50 was added and the reaction vessel was heated at 82° C. for 4.5 hours. The resultant polymer product was diluted with the remaining deionized water, cooled and stored.

EXAMPLE 9

A hydrophobic polyelectrolyte copolymer was formed from 85% DADMAC and 15% dimethylaminoethylacrylate benzyl chloride quaternary (DMAEA.BCQ) monomers. The following reagents were used:

| | |
|---|---|
| 308.35 grams | 72.5% Solution of DADMAC |
| 85.15 grams | 80% Solution of DMAEA.BCQ |
| 0.20 grams | Versene |
| 3.60 grams | V-50 |
| 548.70 grams | Deionized Water |
| 54.00 grams | NaCl |

DADMAC, NaCl, and deionized water were mixed together and heated to 57° C. in a nitrogen atmosphere. Thereafter, the DMAEA.BCQ and 1.80 grams of V-50 were added dropwise for 4 hours via separate syringe pumps to the mixture of DADMAC, NaCl and water. 500 ml of deionized water was taken in an addition funnel, purged with nitrogen and added from time to time as needed. Thereafter, the versene was added and the reaction vessel was heated at 57° C. for an additional 5 hours. 1.80 grams of V-50 was added and the reaction vessel was heated at 82° C. for 4.5 hours. The resultant polymer product was diluted with the remaining deionized water, cooled and stored.

EXAMPLE 10

Table 2 below sets forth the results of a comparative test conducted to evaluate the performance of the hydrophobic polyelectrolyte copolymer coagulants of the present invention verses various conventional organic coagulants.

TABLE 2

| COAGULANT (MOLE %) | FLOCCULANT | DOSAGE (CAT/FLOC-ppm) | SETTLING RATE (INCHES/MIN.) | TURBIDITY (NTU) |
|---|---|---|---|---|
| Poly(DADMAC) | Acrylamide/Acrylic Acid | 0.45/6 | 3.0 | 125 |
| Poly(DADMAC) | Acrylamide/Acrylic Acid | 0.9/6 | 4.5 | 75 |
| Poly(DADMAC) | Acrylamide/Acrylic Acid | 1.5/6 | 7.0 | 68 |
| Poly(DADMAC) | Acrylamide/Acrylic Acid | 3/6 | 4.5 | 90 |
| Poly(DMAEA.MCQ) | Acrylamide/Acrylic Acid | 0.3/6 | 3.0 | 140 |
| Poly(DMAEA.MCQ) | Acrylamide/Acrylic Acid | 1.05/6 | 4.5 | 80 |
| Poly(DMAEA.MCQ) | Acrylamide/Acrylic Acid | 1.5/6 | 3.0 | 70 |
| Poly(DMAEA.BCQ) | Acrylamide/Acrylic Acid | 0.45/6 | 3.0 | 130 |

TABLE 2-continued

| COAGULANT (MOLE %) | FLOCCULANT | DOSAGE (CAT/FLOC-ppm) | SETTLING RATE (INCHES/MIN.) | TURBIDITY (NTU) |
|---|---|---|---|---|
| Poly(DMAEA.BCQ) | Acrylamide/Acrylic Acid | 0.9/6 | 6.0 | 95 |
| Poly(DMAEA.BCQ) | Acrylamide/Acrylic Acid | 1.5/6 | 6.0 | 85 |
| DADMAC/DMAEA.BCQ (90/10)* | Acrylamide/Acrylic Acid | 0.45/6 | 5.0 | 130 |
| DADMAC/DMAEA.BCQ (90/10)* | Acrylamide/Acrylic Acid | 0.9/6 | 6.0 | 65 |
| DADMAC/DMAEA.BCQ (90/10)* | Acrylamide/Acrylic Acid | 1.5/6 | 7.0 | 58 |
| DADMAC/DMAEA.BCQ (90/10) | Acrylamide/Acrylic Acid | 0.45/6 | 3.0 | 98 |
| DADMAC/DMAEA.BCQ (90/10) | Acrylamide/Acrylic Acid | 0.9/6 | 5.0 | 75 |
| DADMAC/DMAEA.BCQ (90/10) | Acrylamide/Acrylic Acid | 1.5/6 | 5.5 | 62 |
| DADMAC/DMAEM.CCQ (95/5) | Acrylamide/Acrylic Acid | 0.45/6 | 4.5 | 180 |
| DADMAC/DMAEM.CCQ (95/5) | Acrylamide/Acrylic Acid | 0.9/6 | 3.0 | 140 |
| DADMAC/DMAEM.CCQ (95/5) | Acrylamide/Acrylic Acid | 1.5/6 | 5.0 | 120 |
| DADMAC/DMAEM.CCQ (95/5) | Acrylamide/Acrylic Acid | 3/6 | 6.0 | 78 |
| DADMAC/DMAEA.BCQ* (85/15) | Acrylamide/Acrylic Acid | 0.45/6 | 4.5 | 180 |
| DADMAC/DMAEA.BCQ* (85/15) | Acrylamide/Acrylic Acid | 0.9/6 | 6.0 | 140 |
| DADMAC/DMAEA.BCQ* (85/15) | Acrylamide/Acrylic Acid | 1.5/6 | 4.5 | 120 |
| DADMAC/DMAEA.BCQ* (85/15) | Acrylamide/Acrylic Acid | 3/6 | 4.5 | 78 |

*Denotes that DADMAC was prepared in NaCl solution.

In Table 2 above the present inventors have compared the settling rate of the hydrophobic polymers of the present invention against Poly(DADMAC) systems. For example, a Poly(DADMAC) and acrylamide/acrylic acid system having a dosage of 1.5/6 was compared against a DADMAC/DMAEA.BCQ and acrylamide/acrylic acid system having a dosage of 1.5/6. A Poly(DADMAC) dosage of 1.5 ppm exhibited a settling rate of 7.0 inches/min. and a turbidity of 68 NTU, whereas the hydrophobic polymer system (i.e., DADMAC/DMAEA.BCQ) exhibited a faster rate of settling at the same polymer dosage (i.e., 7.0 inches/min.) and a turbidity of 58 NTU.

Also compare a Poly(DADMAC) and acrylamide/acrylic acid system having a dosage of 3/6 against a DADMAC/DMAEM.CCQ and acrylamide/acrylic acid system and a DADMAC/DMAEA.BCQ and acrylamide/acrylic acid system having similar dosages. The Poly(DADMAC) dosage of 3 ppm exhibited a settling rate of 4.5 inches/min. and a turbidity of 90 NTU, whereas the hydrophobic polymer systems exhibited equal to or faster settling at the same polymer dosage and lower turbidity.

As demonstrated in Table 2 above and FIG. 1 the hydrophobic polymers of the present invention are capable of providing better clarity (i.e., lower turbidity) and similar or faster settling rates than conventional Poly(DADMAC) based systems.

FIG. 1 attached hereto plots turbidity verses dosage for Poly(DADMAC), DADMAC/DMAEA.BCQ (90:10) prepared in NaCl solution, and DADMAC/DMAEA.BCQ (90:10). It is quite clear from the graph in FIG. 1 that the hydrophobic polymers of the present invention are capable of providing better clarity (i.e., low turbidity) at similar dosages to Poly(DADMAC).

EXAMPLE 11

Various coagulants were evaluated for performance on low cationic demand coal. Each coagulant was used in conjunction with a flocculant, i.e., acrylamide/acrylic acid (AcAm/AA) having a molar ratio of 78:22. The results are set forth in Table 3 below.

TABLE 3

| COAGULANT | ACTIVE DOSE (PPM) | FLOCCULANT | TURBIDITY (NTU) |
|---|---|---|---|
| Poly(DADMAC) | 3.0 | Acrylamide/Acrylic Acid | 200 |
| Poly(DADMAC) | 4.5 | Acrylamide/Acrylic Acid | 180 |
| Poly(DADMAC) | 6.0 | Acrylamide/Acrylic Acid | 150 |
| DADMAC/DMAEA.BCQ* (90:10) | 1.5 | Acrylamide/Acrylic Acid | 180 |
| DADMAC/DMAEA.BCQ* (90:10) | 3.0 | Acrylamide/Acrylic Acid | 160 |
| DADMAC/DMAEA.BCQ* (90:10) | 4.5 | Acrylamide/Acrylic Acid | 140 |
| DADMAC/DMAEA.BCQ (90:10) | 1.5 | Acrylamide/Acrylic Acid | 200 |
| DADMAC/DMAEA.BCQ (90:10) | 3.0 | Acrylamide/Acrylic Acid | 90 |
| DADMAC/DMAEA.BCQ (90:10) | 6.0 | Acrylamide/Acrylic Acid | 110 |

*Denotes that DADMAC was prepared in NaCl solution.

Table 3 above demonstrates that approximately 0.5 parts of the hydrophobic polymer (i.e., DADMAC/DMAEA.BCQ) is required to obtain the same clarity (i.e., turbidity) as 1.0 parts of the Poly(DADMAC). Compare the DADMAC/DMAEA.BCQ and DADMAC/DMAEA.BCQ (prepared with NaCl solution) systems prepared with 1.5 ppm active doses verses the Poly(DADMAC) system prepared with a 3.0 ppm active dose. The hydrophobic polymer systems exhibited similar turbidity numbers as the Poly(DADMAC) system using one-half of the dosage of the Poly(DADMAC) system (i.e., 1.5 ppm verses 3.0 ppm active dosage). When the same active dosage is used for either system the hydrophobic polymer demonstrated much better clarity (i.e., lower turbidity numbers).

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A method for concentrating coal tailings which include liquid and colloidal particles, said method comprising the steps of:

a. feeding said coal tailings to a thickner;

b. treating said coal tailings with a hydrophobic polyelectrolyte copolymer coagulant which comprises diallyldimethylammonium chloride monomer and a hydrophobic monomer selected from the group consisting having of: dialkylaminoethylacrylates having from $C_4$ to $C_{20}$ quaternaries and dialkylaminoethylmethacrylates having from $C_4$ to $C_{20}$ quaternaries, said coagulant is added to the coal tailings in an amount between about 0.05 to about 0.25 lb/ton;

c. treating said coal tailings with a flocculant in an amount between about 0.05 to about 0.25 lb/ton, whereby said colloidal particles agglomerate and settle out as concentrated tailings;

d. discharging concentrated tailings from said thickener; and e. withdrawing clarified liquid from said thickener.

2. The method according to claim 1 further comprising the addition of a second flocculant prior to the addition of said coagulant to said coal tailings.

3. The method according to claim 1 wherein said dialkylaminoethylacrylates are either dimethylaminoethylacrylate benzyl chloride quaternary or dimethylaminoethylacrylate cetyl chloride quaternary.

4. The method according to claim wherein said dialkylaminoethylmethacrylate are either dimethyaminoethylmethacrylate benzyl chloride quaternary or dimethylaminoethylmethacrylate cetyl chloride quaternary.

5. The method according to claim 1 wherein said diallyldimethylammonium chloride and said hydrophobic monomer are present in a molar ratio in the range from 20:80 to 99:1.

6. The method according to claim 1 wherein said flocculant is a copolymer of acrylamide and acrylic acid.

7. The method according to claim 1 wherein said flocculant causes aggregation of the neutralized colloidal particles which are suspended in the tailings suspension and said coagulant causes neutralization at the surface charge of said colloidal particles.

* * * * *